US011473599B2

(12) United States Patent
Alsadah et al.

(10) Patent No.: US 11,473,599 B2
(45) Date of Patent: Oct. 18, 2022

(54) SOLAR SURFACE STEERING SYSTEM AND HYDRAULIC ACTUATOR

(71) Applicant: KING FAHD UNIVERSITY OF PETROLEUM AND MINERALS, Dhahran (SA)

(72) Inventors: Jihad Hassan Alsadah, Dhahran (SA); Muhammad A. Hawwa, Dhahran (SA); Abdulaziz A. Alolayan, Dhahran (SA); Abdullah Hassan Al-Shehri, Dhahran (SA); Saleh Fahad Al-Saykhan, Dhahran (SA); Mohammed Sulieman Bin Zaid, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 881 days.

(21) Appl. No.: 16/360,108

(22) Filed: Mar. 21, 2019

(65) Prior Publication Data

US 2020/0300509 A1    Sep. 24, 2020

(51) Int. Cl.
    *F15B 15/12* (2006.01)
    *H02S 20/32* (2014.01)
    (Continued)

(52) U.S. Cl.
    CPC ........... *F15B 15/12* (2013.01); *F24S 30/455* (2018.05); *F24S 50/20* (2018.05); *H02S 20/30* (2014.12);
    (Continued)

(58) Field of Classification Search
    CPC ..... F15B 15/12; F15B 15/1404; F24S 30/455; F24S 50/20; F24S 2030/11; H02S 20/30;
    (Continued)

(56) References Cited

U.S. PATENT DOCUMENTS 1,569,429 A * 1/1926 Lippert ............... F01C 9/00
                                                            91/347
2,564,206 A * 8/1951 Johnson ............ F15B 15/12
                                                             91/44
(Continued)

FOREIGN PATENT DOCUMENTS

CN       102298393 A     12/2011
DE    102008023549 A1    11/2009

*Primary Examiner* — Dustin T Nguyen
(74) *Attorney, Agent, or Firm* — Oblon, McClelland, Maier & Neustadt, L.L.P.

(57) ABSTRACT

The present disclosure provides a solar surface steering system including a solar surface; a base mount; a main body having a first rotary vane actuator configured to rotate the solar surface via a first rotating joint, and a second rotary vane actuator configured to rotate the main body of the hydraulic actuator via a second rotating joint connected to the base mount; a fluid mover operably connected to each of the first and second rotary vane actuators and configured to actuate the first and second rotary vane actuators; and a control system electrically connected to the fluid mover and configured to control operations of the fluid mover, wherein the first and second rotary vane actuators are affixed to each other and positioned such that a rotational axis of the first rotary vane actuator is orthogonal to a rotational axis of the second rotary vane actuator.

15 Claims, 13 Drawing Sheets

(51) Int. Cl.
    *F24S 30/455*     (2018.01)
    *F24S 50/20*     (2018.01)
    *H02S 20/30*     (2014.01)
    *B25J 9/14*     (2006.01)
    *F24S 30/00*     (2018.01)

(52) U.S. Cl.
    CPC ............... *H02S 20/32* (2014.12); *B25J 9/148* (2013.01); *F24S 2030/11* (2018.05); *Y02E 10/47* (2013.01)

(58) Field of Classification Search
    CPC .......... H02S 20/32; B25J 9/148; Y02E 10/47; Y02E 10/50
    USPC ................... 92/125, 122, 121, 120
    See application file for complete search history.

(56) References Cited

U.S. PATENT DOCUMENTS

| | | | |
|---|---|---|---|
| 2,802,458 A * | 8/1957 | McDonnell | F15B 15/12 91/313 |
| 2,913,583 A * | 11/1959 | Regnier | G01S 3/7861 136/246 |
| 3,102,454 A * | 9/1963 | Pinkston | H01Q 3/08 91/177 |
| 3,276,332 A * | 10/1966 | Jaffe | B64C 13/00 416/157 A |
| 3,613,519 A * | 10/1971 | Southall | F15B 15/12 92/170.1 |
| 3,731,599 A * | 5/1973 | Allen | F03C 7/00 92/125 |
| 4,365,617 A * | 12/1982 | Bugash | F24S 20/20 126/643 |
| 4,376,372 A * | 3/1983 | English, Jr. | F24S 50/00 126/909 |
| 4,586,488 A | 5/1986 | Noto | |
| 4,890,599 A * | 1/1990 | Eiden | F24S 30/452 126/606 |
| 8,104,465 B2 * | 1/2012 | Kribus | H01L 31/058 136/246 |
| 8,609,977 B2 * | 12/2013 | Jones | F24S 30/425 250/203.1 |
| 8,943,817 B2 | 2/2015 | Blitz et al. | |
| 9,140,403 B2 * | 9/2015 | Blitz | H02S 20/10 |
| 9,231,222 B2 * | 1/2016 | Sung | H01L 51/0541 |
| 10,330,345 B1 * | 6/2019 | Sanchez Vega | F24S 30/458 |
| 2005/0281698 A1 * | 12/2005 | Satanovskiy | F04C 15/0011 418/248 |
| 2011/0122606 A1 * | 5/2011 | Ku | H02S 20/00 136/246 |
| 2012/0318325 A1 * | 12/2012 | Liu | H01L 31/054 136/246 |
| 2014/0069483 A1 | 3/2014 | Wolter et al. | |

\* cited by examiner

SOLAR SURFACE STEERING SYSTEM AND HYDRAULIC ACTUATOR

BACKGROUND

Field of Disclosure

The present disclosure relates generally to a solar surface steering system and a hydraulic actuator, and more particularly to a solar surface steering system using hydraulic actuators for two-dimensional steering of a solar surface and to a two dimensional steering hydraulic actuator for a solar surface.

Description of the Related Art

Steering is a common technique to increase the energy yield in solar energy photovoltaic panels. Steering increases the geometric efficiency of solar surfaces. Non-steered solar surfaces are less productive compared to steered ones. Further, two-dimensional (2D) steering is more effective than single dimensional (1D) steering. There are several techniques to perform such steering using electrical drives and stepper motors. To increase accuracy, the electrical actuation is performed through various gearing systems. Another steering application is to steer solar reflectors toward a tower target. Although the steering problem must be two-dimensional, the necessary degree of accuracy is much higher compared to photovoltaic steering.

Solar surfaces, including photovoltaic panels, solar reflectors for central towers, and parabolic dishes, all need 2D steering. Maximizing total energy output requires increasing either the number of units or the size per unit (or both). The cost of steering mechanisms increases with the size of the units and/or the number of units since the power of electrical motors and the number of motors must both increase.

Hydraulic technology offers a solution where a central hydraulic drive can be shared by several or all actuators. The degree of accuracy is not limited by the step size or even micro-step size of electrical motors. In fact any step can be achieved by limiting the flow rate and proper timing of corresponding hydraulic valves.

Hydraulic actuators are available in several different types: linear actuators, continuous rotation actuators, and limited angle actuators. In the steering problem, only the linear piston actuator and limited angle rotary actuator can provide steering. Although linear pistons have been conventionally used for steering, linear pistons can be bulky and may not be suitable for dusty environments.

The limited angle rotary actuator (also referred to as a "rotary vane actuator") contains two vanes: a fixed vane and a moving vane; see FIG. 1. These two vanes divide the cylindrical volume into two regions or cavities, and relative pressure on the moving vane causes it to rotate. This hydraulic action of rotating the moving vane drives the axis rotation, and the axial rotation does the useful work expected from the actuator.

The two cavities of the actuator are connected by a proper valve system to high and low hydraulic pressure. To reverse the motion, the pressure direction must be switched. A 4-valve system or a specialized 4-way valve can be used to perform this reversible process.

In one example of a known surface steering apparatus is disclosed in patent document U.S. Pat. No. 8,943,817 B2. In this example, a system and method are disclosed for moving an object in one axis including one or more fluid inflatable containers which are arranged to transmit fluid pressure to a plunger, such that a flexible membrane of the fluid inflatable container engages with the plunger and forms a rolling lobe in response to changes in volume. The fluid inflatable containers are enclosed within an enclosure or drum, and a shaft runs axially through the center of the enclosure. However, in this example, the object can only be steered in one rotational dimension.

Another example offers a reflective solar tracing system (U.S. Pat. No. 4,586,488A) of the type arranged to reflect light rays from the sun onto a remote solar energy collector. This system provides a two dimensional steering to compensate for altitudinal and azimuthal changes in the position of the sun using a sensor device to point at the sun and provide control signals to a drive mechanism so that the reflector is moved in response to solar movement.

Especially for solar tracking devices, systems and methods, a compact steering apparatus that can be shared among several solar devices is desired. Conventional rotary actuators suffer from rotational restrictions, complexity and size. Accordingly, it is one object of the present disclosure to describe a two-dimensional steering hydraulic actuator for a solar surface.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY OF THE INVENTION

A first aspect of the present disclosure provides a solar surface steering system including: a solar surface, a base mount; and a main body having a first rotary vane actuator configured to rotate the solar surface via a first rotating joint, and a second rotary vane actuator configured to rotate the main body of the hydraulic actuator via a second rotating joint connected to the base mount, wherein the first and second rotary vane actuators are affixed to each other and positioned such that a rotational axis of the first rotary vane actuator is orthogonal to a rotational axis of the second rotary vane actuator.

A second aspect of the present disclosure provides a two dimensional steering hydraulic actuator for a solar surface including a base mount; and a main body having a first rotary vane actuator configured to rotate the solar surface via a first rotating joint, and a second rotary vane actuator configured to rotate the main body of the hydraulic actuator via a second rotating joint connected to the base mount, wherein the first and second rotary vane actuators are affixed to each other and positioned such that a rotational axis of the first rotary vane actuator is orthogonal to a rotational axis of the second rotary vane actuator.

This disclosure describes a simple, cost effective design for a solar surface steering system that is compact, is easily installable, is steady, and has a large angular range in both degrees of freedom without a need for complex, costly, or unreliable electronic mechanisms to realize 2D steering.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
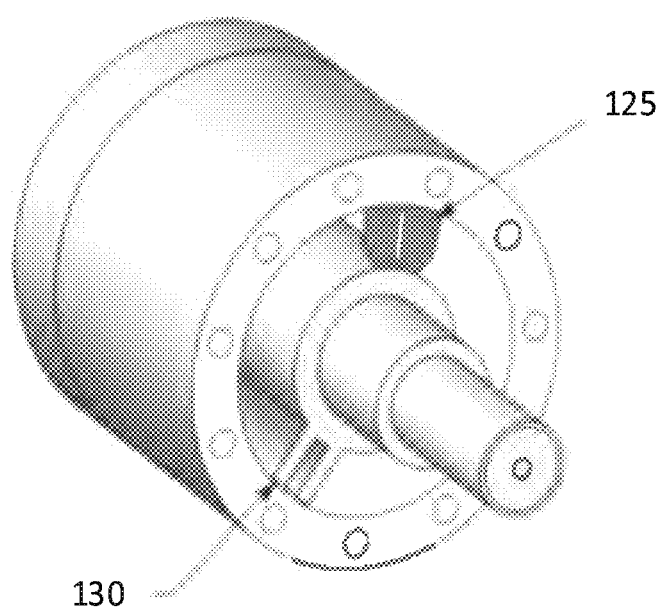
FIG. 1 illustrates a conventional rotary vane actuator having a fully cylindrical shape with a moving vane and a fixed vane.
Figure 2:
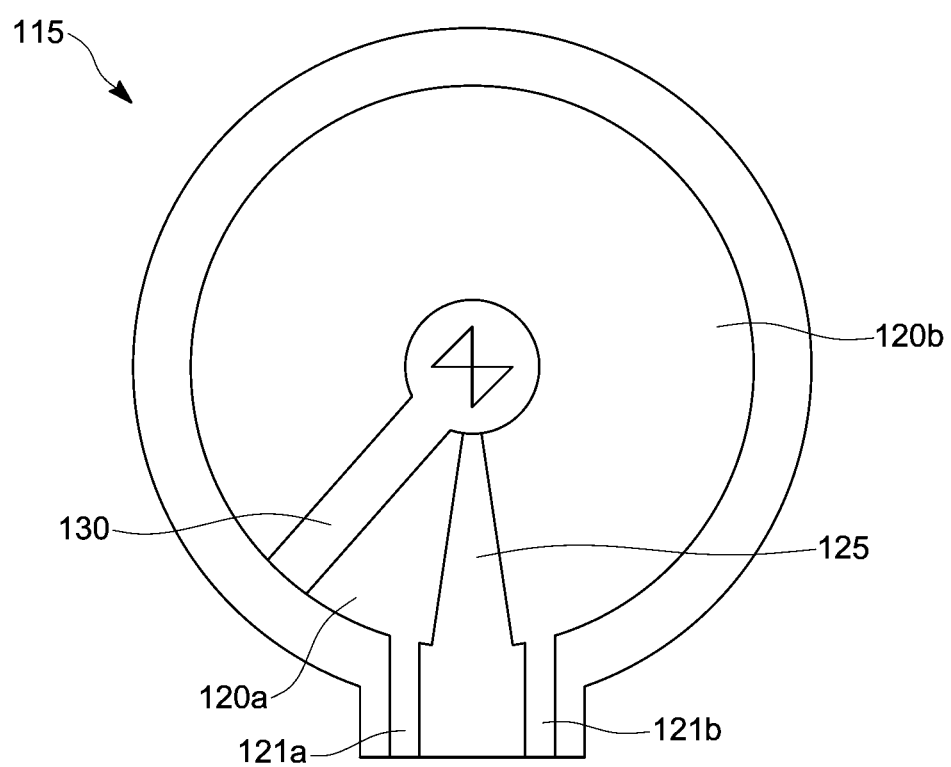
FIG. 2 illustrates a conventional rotary vane actuator having a fully cylindrical shape with a moving vane and a fixed vane.
Figure 3:
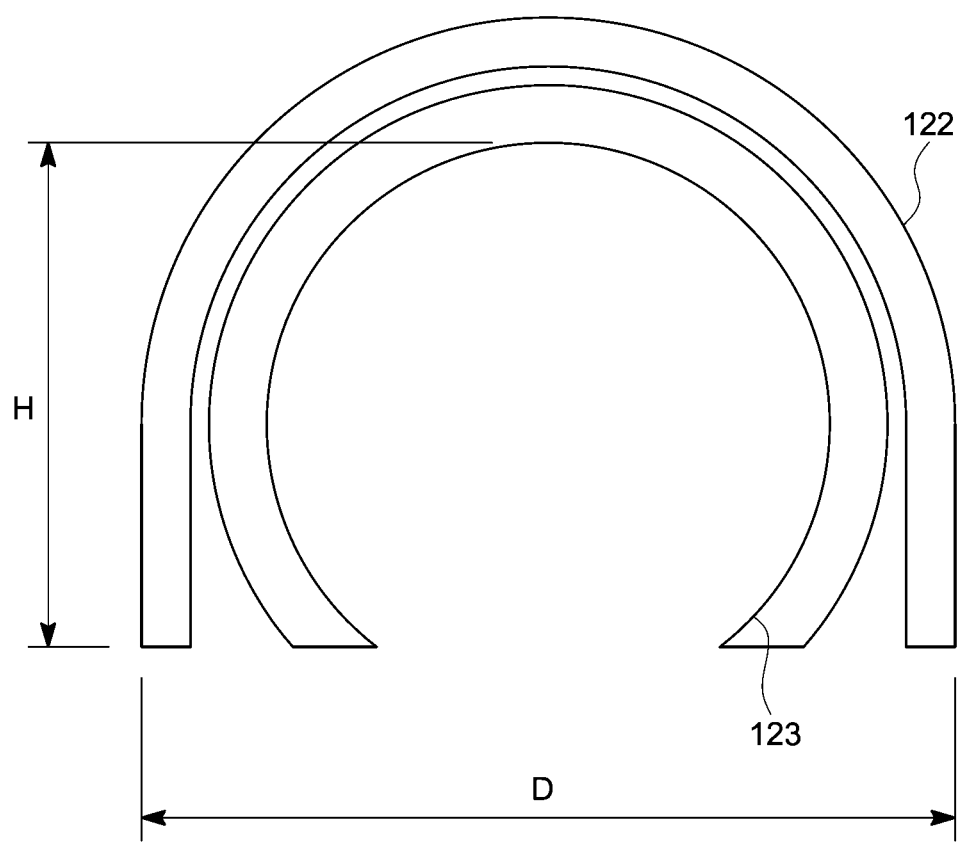
FIG. 3 illustrates an example of the shape and dimensions of the walls of a semi-cylindrical rotary vane actuator used in an example embodiment of the present disclosure.

In the conventional design of a limited angle rotary actuator (i.e., rotary vane actuator) as shown in FIGS. 1 and 2, a complete cylinder is used. In an exemplary embodiment of the present disclosure, a cavity 120 formed by an inner wall 123 of the rotary vane actuator has the shape of a cylinder truncated (removed) below a plane parallel to the central axis forming a horizontal cylindrical segment with a height H greater than or equal to the radius of the cylinder (hereinafter, simply referred to as "semi-cylindrical") as shown in FIG. 3. For example, the semi-cylindrical shape may represent a partial cylinder open along a plane parallel to the central axis such that the inner wall 123 of the partial cylinder represents a sweep of 270-180, preferably 260-190, 250-200, 240-210, 230-220 degrees. The cross-section of the rotary vane actuator may also form, for example, a U-shape at the outer wall 122. The U-shape defining a portion of a cylinder, e.g., 180 degree sweep of the cylinder with walls extending from the edges of the partial cylinder. The walls are preferably substantially parallel but spread or narrow together at an angle such as 5-45, 10-40, 15-35, 20-30 or 25 degrees. Therefore, such a semi-cylindrical rotary vane actuator has a fixed vane shorter than a moving vane thereof. The moving vane has a shorter angular range than in the conventional complete cylinder but the range may still be more than 180 degrees. Further, the two sides of the moving vane still serve as high and low pressure cavities.

Hereafter, an exemplary embodiment of the present invention will be described with reference to the drawings. In the drawings, the same elements are denoted by the same reference numerals, and thus redundant descriptions thereof are omitted as needed.

Exemplary Embodiment

Figure 4:
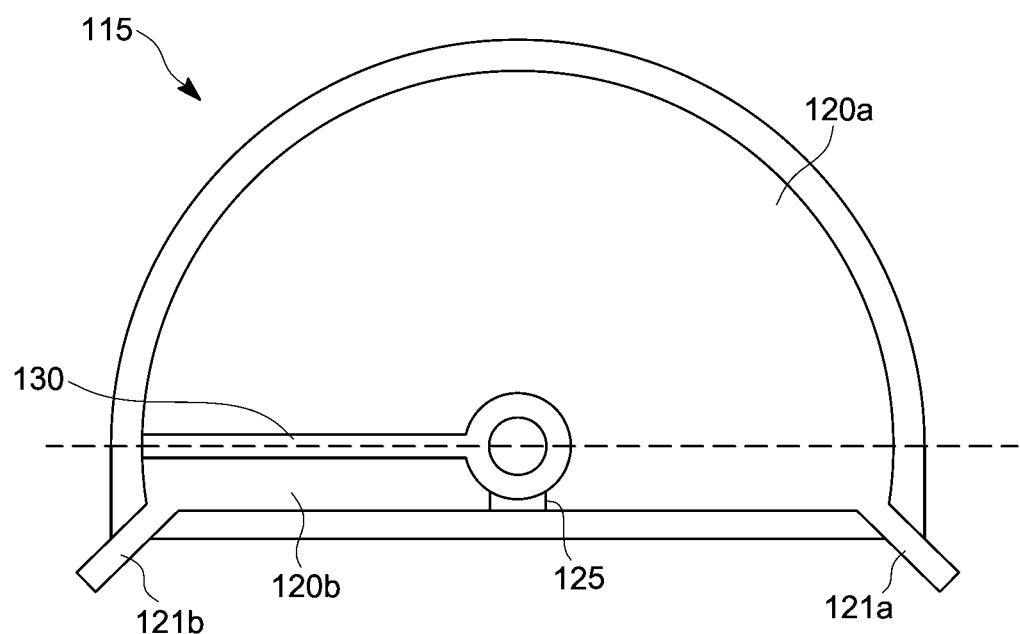
FIG. 4 illustrates a semi-cylindrical rotary vane actuator used in an example embodiment of the present disclosure.

FIG. 4 shows a rotary vane actuator 115 of the present disclosure that has a substantially semi-cylindrical shape in which a fixed vane 125 is shorter than a moving vane 130. The truncation of the cylinder allows a second partial cylinder that is oriented 90 degrees with respect to the first to be welded to the first partial cylinder. This arrangement allows the axes of rotation of the two rotary vane actuators to be orthogonal to each other, thereby providing two-dimensional steering of a solar surface 150. The dotted line across the diameter of the rotary vane actuator 115 in FIG. 4 shows the approximate range of the moving vane 130 in the present embodiment.

In the rotary vane actuator 115, a cavity 120 is divided into two sides (first side cavity 120a and second side cavity 120b) by the moving vane 130. Each side of the cavity 120a, 120b is respectively connected to a first hydraulic port 121a, 121b through which a hydraulic fluid is either input or drained. For example, with respect to FIG. 4, if a clockwise rotation of the rotational axis is desired, the hydraulic fluid is input to the second hydraulic port 121b filling the second side cavity 120b and causing the moving vane 130 to move toward the low pressure side (in this case, first side cavity 120a) where hydraulic fluid is drained through first hydraulic port 121a. Such movement of the moving vane causes, for example, a shaft connected thereto and disposed in the axial direction of the rotary vane actuator 115 to turn in the clockwise direction which produces the desired rotational output force. For a desired counterclockwise rotation, the operations are simply reversed, i.e., inputting hydraulic fluid into the first hydraulic port 121a, and draining hydraulic fluid from the second hydraulic port 121b.

For inputting and removing hydraulic fluid to the respective rotary vane actuators 115, the first and second hydraulic ports 121a, 121b may be operably connected to a fluid mover via hoses, tubes, or the like. The fluid mover may simply move fluid from one hydraulic port to the other causing an increase in fluid volume and pressure on one side of the cavity 120 while decreasing the fluid volume and pressure on the other side of the cavity 120, thereby causing the moving vane to move. Alternatively, a fluid mover may be connected to each hydraulic port 121a, 121b and fluid may be moved between sides of the cavity 120 and, for example, one or more fluid containers external to the rotary vane actuators.

Each fluid mover is also electrically connected to a power supply and a control system for controlling the operations of the fluid movers. Some examples of the fluid mover are an external gear pump, an internal gear pump, and a piston pump; however, any conventional fluid mover suitable for a conventional rotary vane actuator 115 may be used for the semi-cylindrical rotary vane actuators of the present disclosure. Further, one or more control valves may be provided between the fluid movers and the respective rotary vane actuators and electronically actuated by the control system 200 to control the flow of hydraulic fluid to/from the respective cavities 120 of the rotary vane actuators, thereby controlling the movement of the solar surface. The control valves may be, for example, 4-way valves employed to reverse (switch) the direction of fluid flow between the first and second hydraulic ports 121a, 121b and may be components of the fluid mover itself. In a case in which a bi-directional fluid mover is used for each rotary vane actuator (i.e., two independently operating bi-directional fluid movers), such control valves may be unnecessary.

The control system 200 for controlling the fluid movers and/or the control valves may be a general purpose computer or dedicated circuitry with memory and a processor, such as a microcontroller. An example of such a computer will be described later in further detail. The control system 200 may have a set of instructions pre-stored in memory for moving the solar surface or may accept instructions from, for example, a user depending on design requirements.

Figure 6:
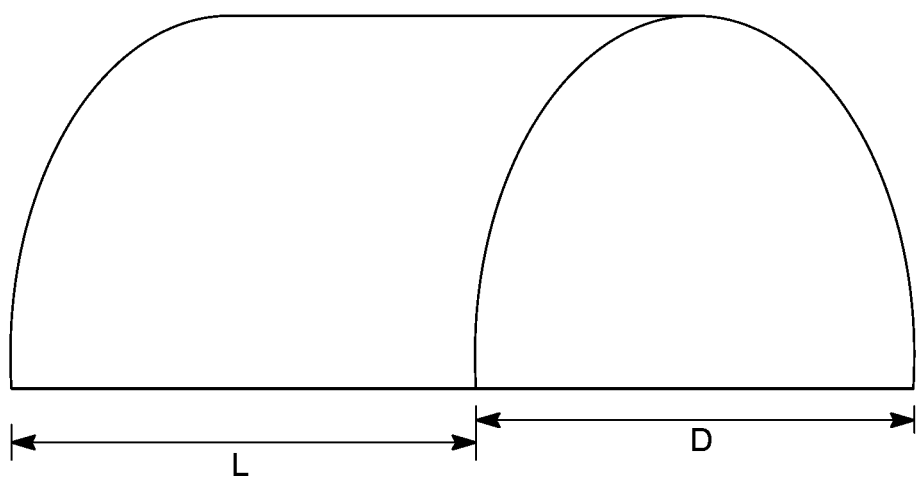
FIG. 6 illustrates a view of a semi-cylindrical rotary vane actuator in which the axial length L and the diameter D are approximately equal.
Figure 7:
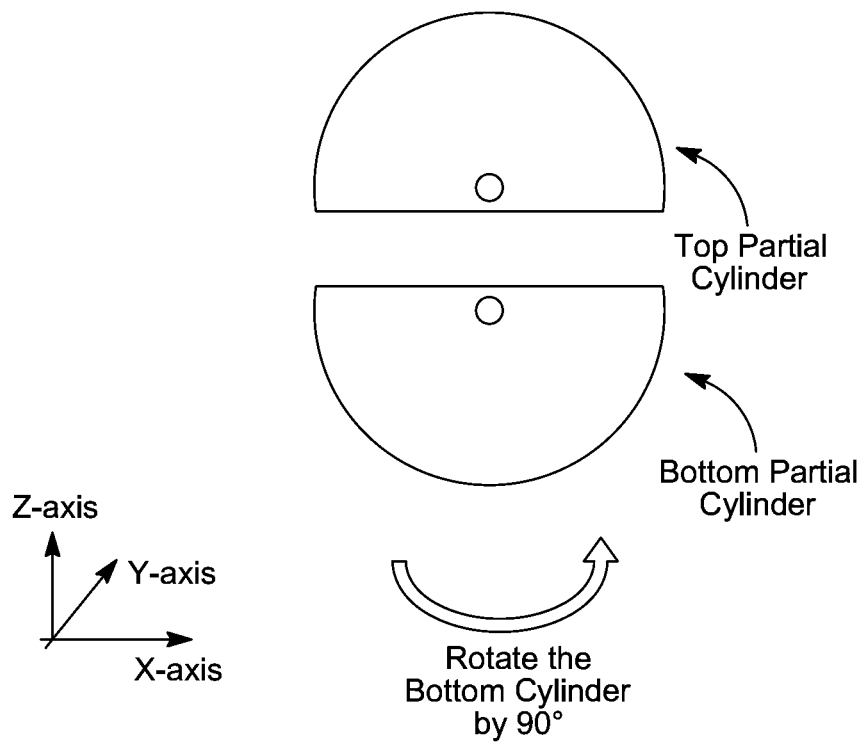
FIG. 7 illustrates a pair of rotary vane actuators in which one of the pair of rotary vane actuators is rotated 90 degrees and affixed to the other rotary vane actuator.

In the present embodiment, as shown in FIG. 6, if the diameter D of the rotary vane actuators 115 is close to the axial length L, then the shape formed by the edges of one side of the rotary vane actuator is square-like or rectangular. When affixing two of the rotary vane actuators 115 together as described above and shown in FIG. 7, the two square-like regions are aligned and connected together, preferably welded, forming a main body 110 of the solar surface steering system 100. This joining of the two semi-cylindrical rotary vane actuators 115 provides stability and a compact design. In particular, the two axes of rotations are close to each other (although both horizontal) and 90 degrees rotated. That is, the distance between the two axes (in the Z direction) is less than the diameter D of the two rotary vane actuators 115.

Figure 8:
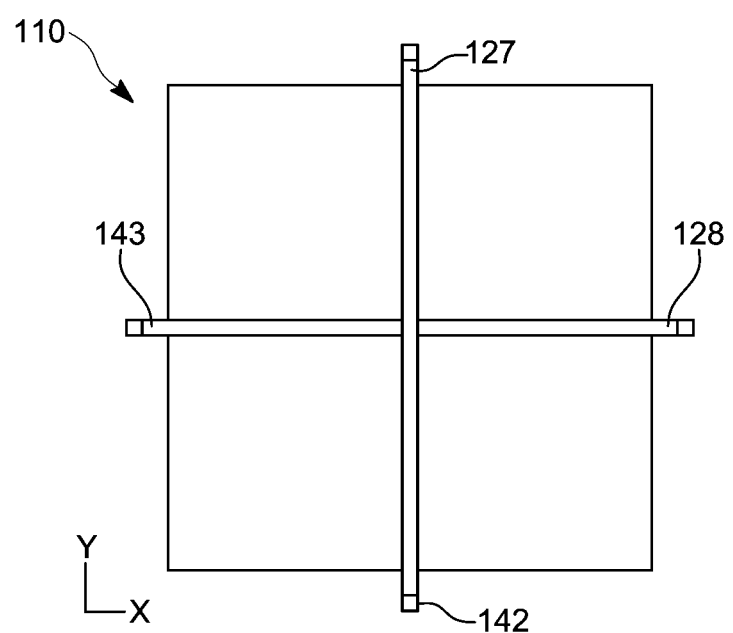
FIG. 8 illustrates a top down view of a main body of an exemplary embodiment of the present disclosure.

In FIG. 8 showing a top down view of the present exemplary embodiment, a first rotational axis 127 (rotating shaft) of the top rotary vane actuator 115 is joined to a first rotating joint 142 for rotating a solar surface 151. The second rotational axis 128 (rotating shaft) of the bottom rotary vane actuator 115 is joined to a second rotating joint 143 for rotating the main body 110.

Figure 9:
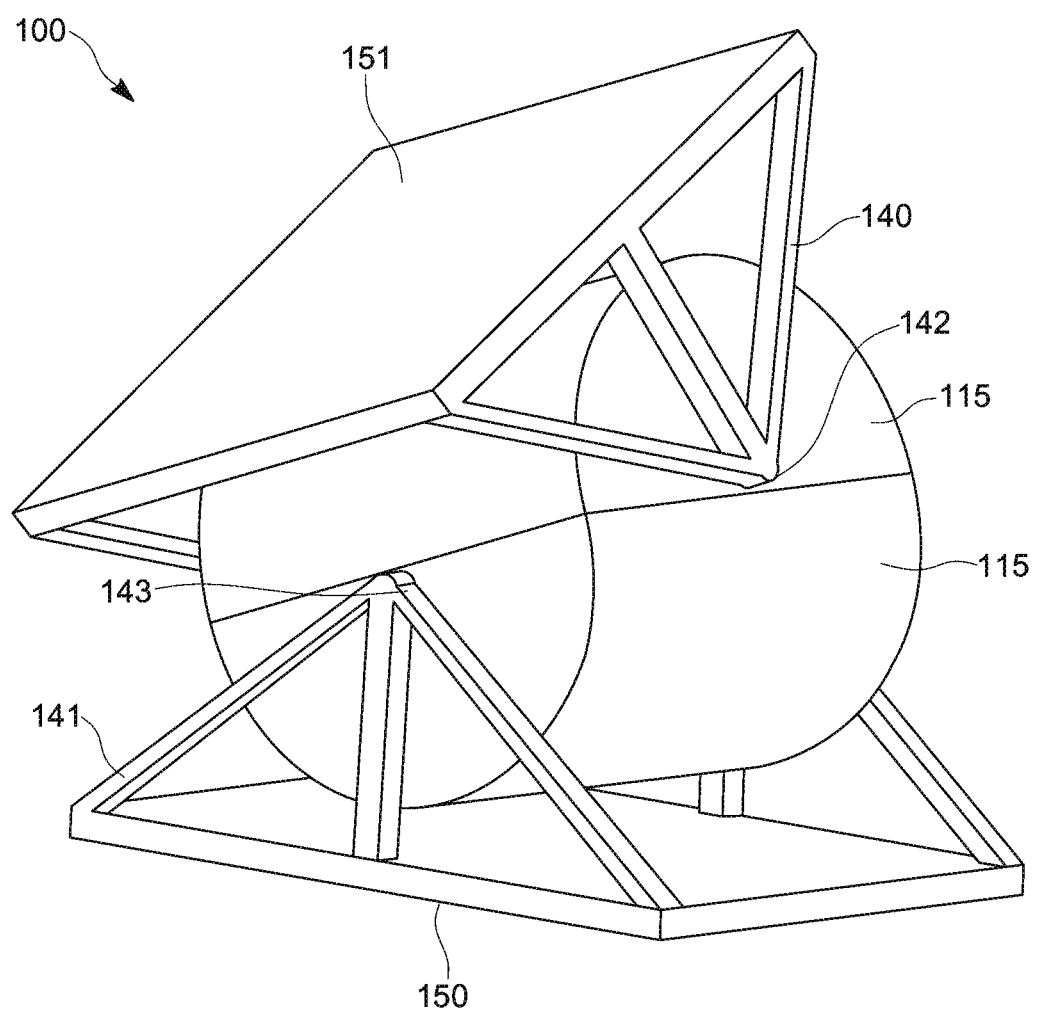
FIG. 9 illustrates a solar surface steering system of an exemplary embodiment of the present disclosure.
Figure 10:
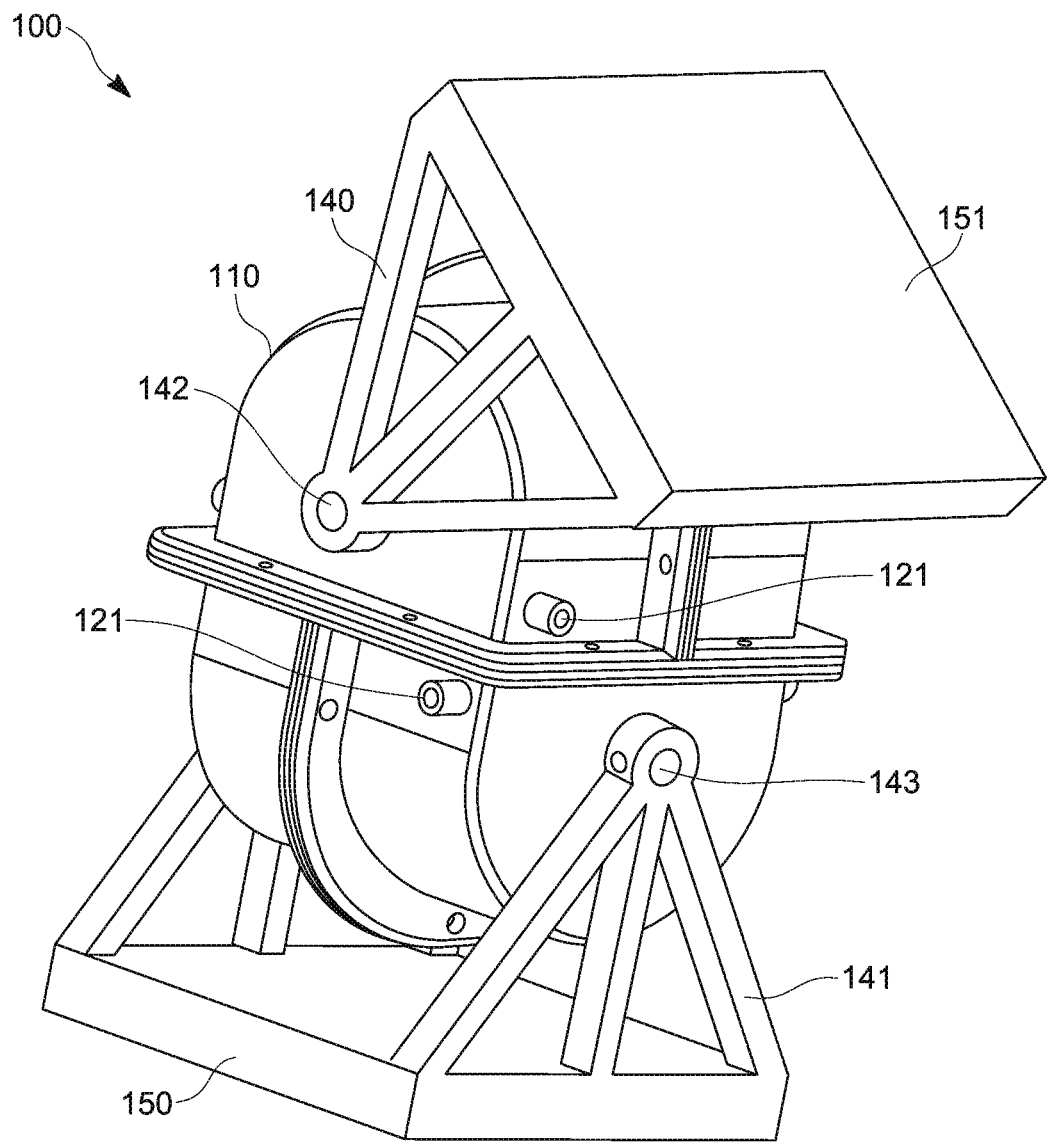
FIG. 10 illustrates a solar surface steering system of an exemplary embodiment of the present disclosure.

FIGS. 9 and 10 each show an example of a 2D steering hydraulic actuator of the present disclosure. At the first rotating joint 142, a holding member 140 is connected the first rotational axis 127 and holds a solar surface 151. Any number of the holding member 140 may be connected to either or both ends of the first rotational axis 127, and the holding members 140 may be, for example, bars, shafts, spokes, plates, or the like; however, a larger number of holding members 140 is generally preferable to provide greater stability. Likewise, any length of the holding members 140 may be used; however, a shorter separation between the rotational axis 127 and the solar surface 151 is preferable in terms of stability.

Further, at the second rotating joint 143 of the bottom rotary vane actuator 115, a supporting member 141 is connected at the second rotational axis 128 supporting the main body 110 and the other end of the support member is connected to a base mount 150. Similar to the holding members 140, any number of the support member 141 may be connected to either or both ends of the second rotational axis 128, and the support members 141 may be, for example, bars, shafts, spokes, plates, or the like; however, a larger number of support members 141 is generally preferable to provide greater stability. Likewise, any length of the supporting members 140 may be used; however, a shorter separation between the rotational axis 128 and the base mount 150 is preferable in terms of stability.

In addition, as can be seen in FIGS. 9 and 10, the main body 110 is not directly grounded but rather hanging in the air above the base mount 150 by way of the supporting members 141. One side of the solar surface steering system 100 is grounded and the other side is the base of the solar surface to be steered. This arrangement makes the main body 110 compact and installable just below the solar surface. In short, this actuator can be set on the main support axis just below the steered solar surface. The actuator appears like a universal joint with its own ability to convert hydraulic pressure to controlled steering.

It should be noted that hydraulic pressure generates the needed torque. However, there is a dependence on the moving vane's area, which includes both the axial and radial size of the cylinder. Therefore, the torque needed affects the overall size of the solar surface steering system 100. In other embodiments of the invention torque, rotational movement and/or moving force may be provided by any one or more of a pneumatic, electric or piezoelectric actuator in place of or in addition to the hydraulic actuator (motor).

Figure 11:
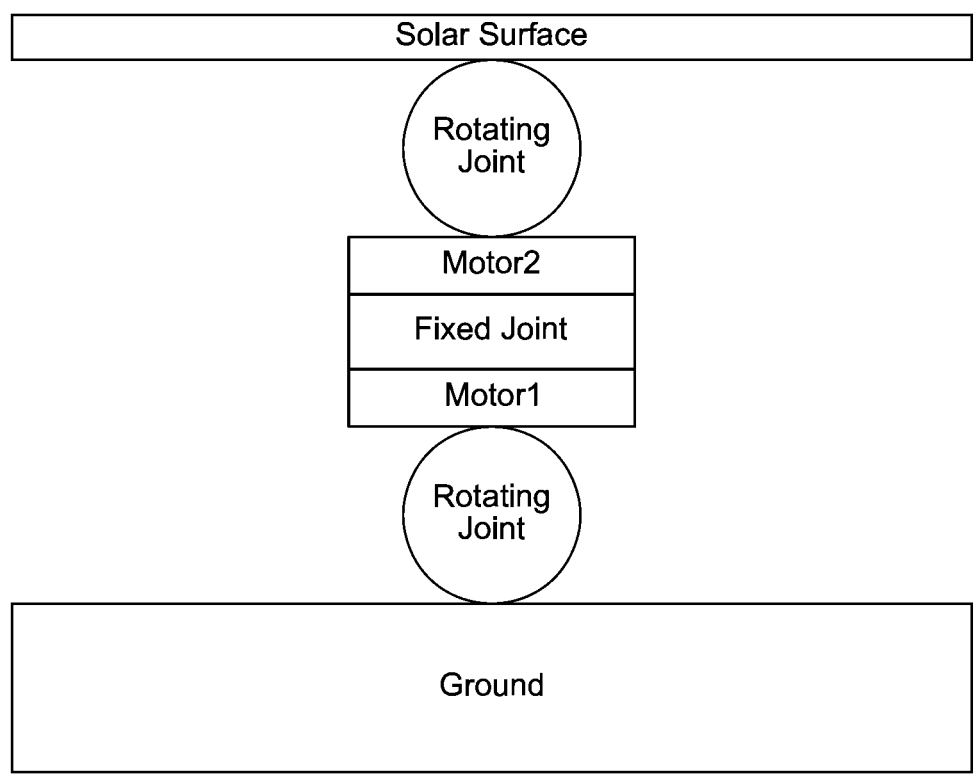
FIG. 11 illustrates the basic connection configuration of an exemplary embodiment of the present disclosure.

FIG. 11 shows the basic configuration of the solar surface steering system 100 in terms of its component connections. As is apparent in the figure, two actuators (motors) are affixed to one another (representing the main body 110) by way of a fixed joint. Each actuator is connected to separate and distinct rotating joints. One of the rotating joints controls one rotational axis which moves the solar surface, and the other rotating joint controls the other rotational axis (in this case, rotating the main body 110 in a direction orthogonal to the rotational axis which moves the solar surface). It should be clear that this configuration allows for a simple and compact design of the solar surface steering system 100.

It should be apparent from the foregoing that numerous modifications and variations of the present disclosure are possible in light of the above teachings. It is therefore to be understood that within the scope of the appended claims, the invention may be practiced otherwise than as specifically described herein.

Figure 5:
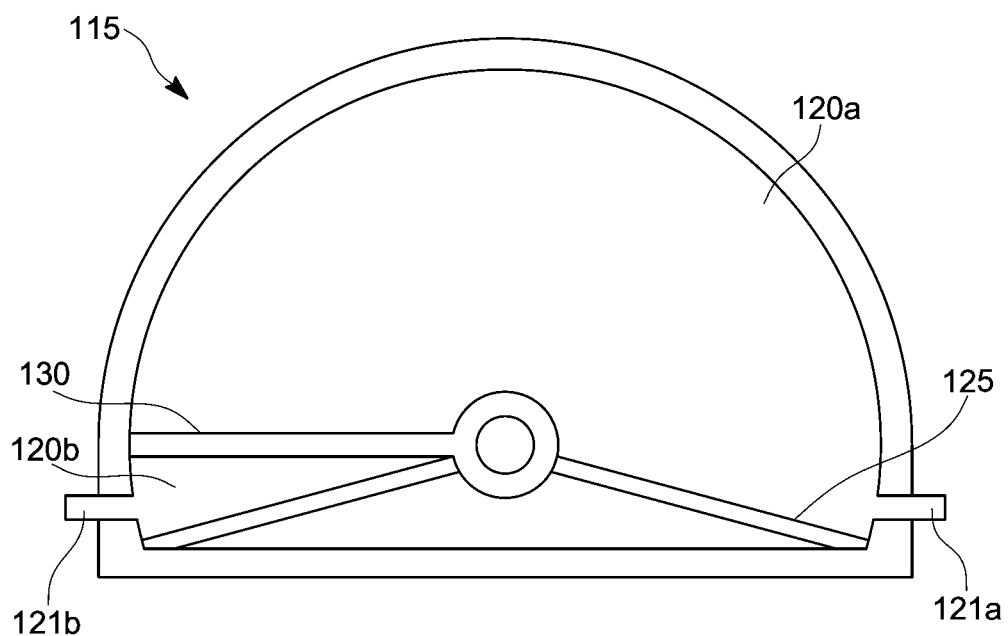
FIG. 5 illustrates another semi-cylindrical rotary vane actuator used in an example embodiment of the present disclosure.

For example, a short fixed vane 125 with a length less than that of the moving vane 130 is used in the exemplary embodiment described above in accordance with FIG. 4. However, alternatively, two full length fixed vanes 125 can be used. An example of this configuration is shown in FIG. 5. This arrangement allows for an unused area just below the rotational axis of the rotary vane actuator that could be used to house any type of additional components, hoses, etc., as necessary for design purposes and may be freely selected by a person skilled in the art.

In addition, in the exemplary embodiment the top and bottom surfaces of the main body 110 is separated from both the base mount and the solar surface; however, rollers, wheels, gears, casters, or the like may be provided therebetween for additional support and stability.

Furthermore, the cavity 120 may include flexible bags to be filled with hydraulic fluid, air, water, or the like through the hydraulic ports 121. These bags are able to reduce requirements of tight sealing between the vanes and the touching boundaries.

It should be noted that the hydraulic ports 121 shown in FIGS. 4, 5, and 10 are located in slightly different positions. The positions of the hydraulic ports 121 are not particularly limited as long as they are sufficiently connected to opposite sides of the cavity 120 within the rotary vane actuators 115.

In addition, while the holding member 140 and the supporting member 141 are similar, it is not necessary for them to be the same in size, shape, type, or number and may be selected appropriately in accordance with preference or design specification.

The solar surface as shown in the figures is a flat plate; however, the solar surface is not particularly limited to such a shape and may be, for example, circular, rectangular, or polygonal, and may be flat, concave, convex, etc. as needed depending on the desired purpose of the solar surface.

Also, the base mount 150 is depicted in the figures as a flat plate; however, the base mount 150 should not be considered as limited to this and may simply be the ends of the supporting members acting as feet which support the main body 110.

Pressure sensors may be included within the rotary vane actuators to measure the exact pressure on opposing sides of the cavity 120, and these pressure sensors may be connected to the control system 200 in order to more precisely control the steering of the solar surface 151.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
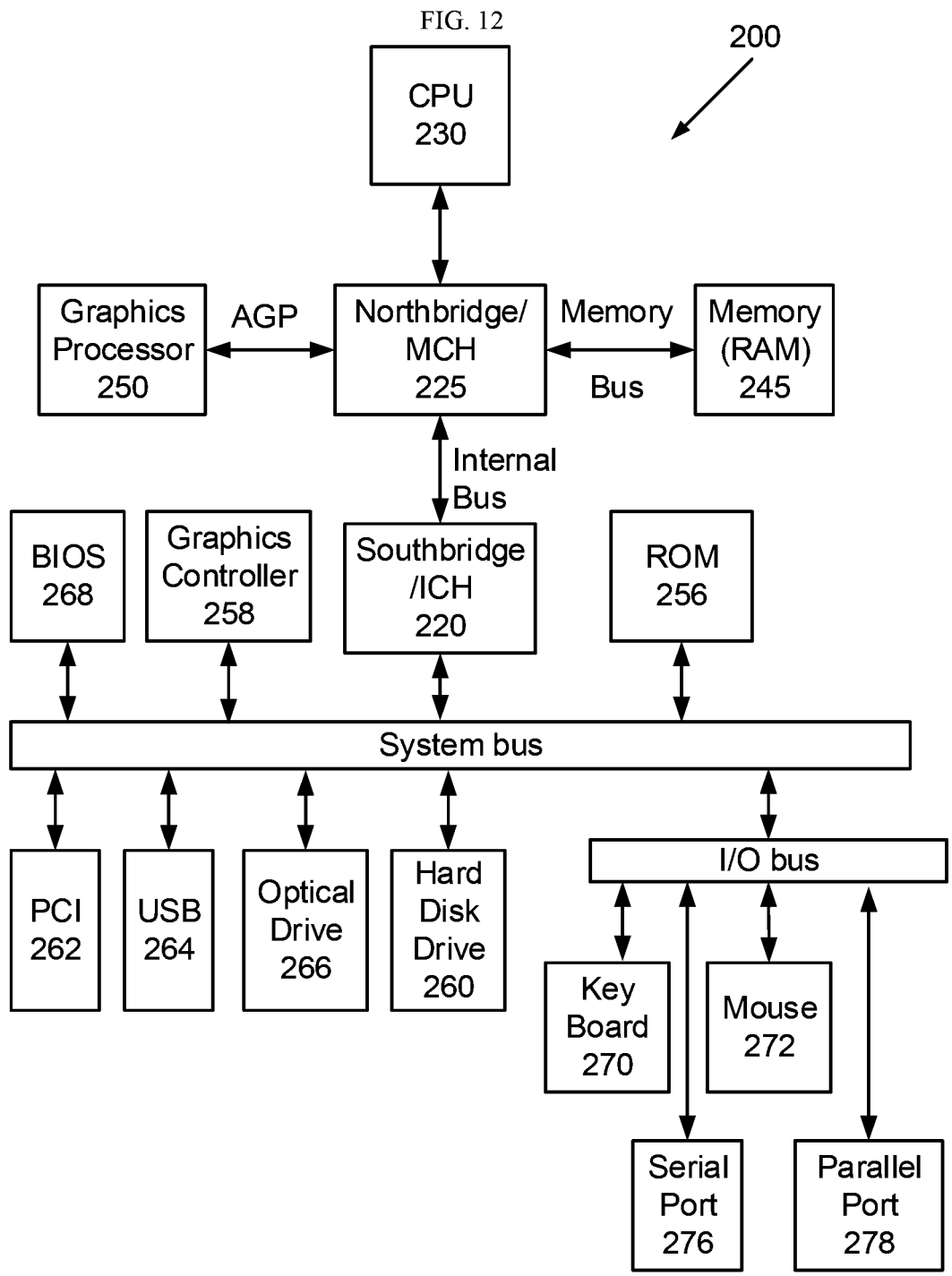
FIG. 12 illustrates an example of a schematic diagram of a computer for use as a control system.

FIG. 12 shows a schematic diagram of a data processing system, according to certain embodiments, for performing controlling a fluid mover and control valves thereof. The data processing system is an example of a computer in which code or instructions implementing the processes of the illustrative embodiments may be located.

In FIG. 12, data processing system 200 employs a hub architecture including a north bridge and memory controller hub (NB/MCH) 225 and a south bridge and input/output (I/O) controller hub (SB/ICH) 220. The central processing unit (CPU) 230 is connected to NB/MCH 225. The NB/MCH 225 also connects to the memory 245 via a memory bus, and connects to the graphics processor 250 via an accelerated graphics port (AGP). The NB/MCH 225 also connects to the SB/ICH 220 via an internal bus (e.g., a unified media interface or a direct media interface). The CPU Processing unit 230 may contain one or more processors and even may be implemented using one or more heterogeneous processor systems.

Figure 13:
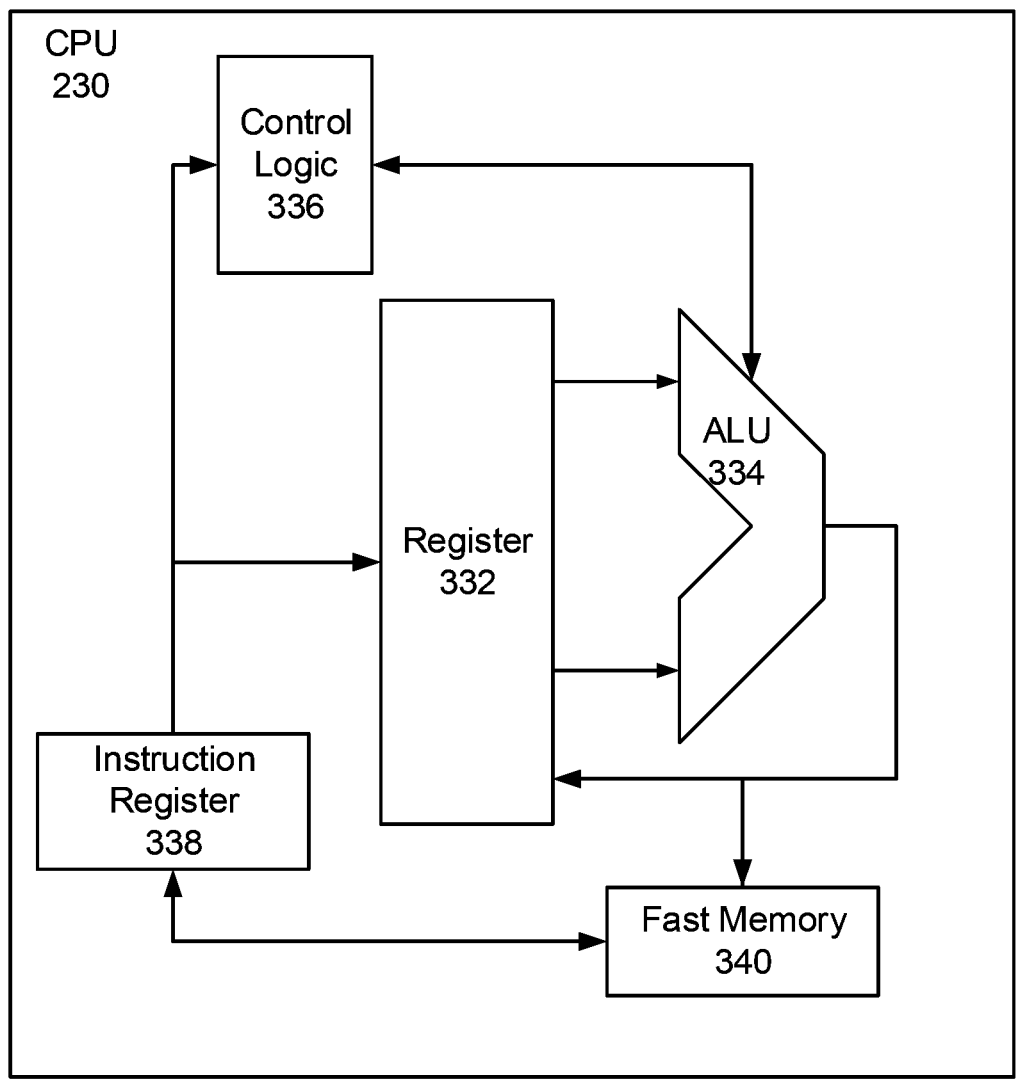
FIG. 13 illustrates one implementation of a CPU shown in FIG. 12.

For example, FIG. 13 shows one implementation of CPU 230. In one implementation, the instruction register 338 retrieves instructions from the fast memory 340. At least part of these instructions are fetched from the instruction register 338 by the control logic 336 and interpreted according to the instruction set architecture of the CPU 330. Part of the instructions can also be directed to the register 332. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 334 that loads values from the register 332 and performs logical and mathematical operations on the loaded values according to the instructions. The results from these operations can be feedback into the register and/or stored in the fast memory 340. According to certain implementations, the instruction set architecture of the CPU 330 can use a reduced instruction set architecture, a complex instruction set architecture, a vector processor architecture, a very large instruction word architecture. Furthermore, the CPU 330 can be based on the Von Neuman model or the Harvard model. The CPU 330 can be a digital signal processor, an FPGA, an ASIC, a PLA, a PLD, or a CPLD. Further, the CPU 330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 200 can include that the SB/ICH 220 is coupled through a system bus to an I/O Bus, a read only memory (ROM) 256, universal serial bus (USB) port 264, a flash binary input/output system (BIOS) 268, and a graphics controller 258. PCI/PCIe devices can also be coupled to SB/ICH 220 through a PCI bus 262.

The PCI devices may include, for example, Ethernet adapters, add-in cards, and PC cards for notebook computers. The Hard disk drive 260 and CD-ROM 266 can use, for example, an integrated drive electronics (IDE) or serial advanced technology attachment (SATA) interface. In one implementation the I/O bus can include a super I/O (SIO) device.

Further, the hard disk drive (HDD) 260 and optical drive 266 can also be coupled to the SB/ICH 220 through a system bus. In one implementation, a keyboard 270, a mouse 272, a parallel port 278, and a serial port 276 can be connected to the system bust through the I/O bus. Other peripherals and devices that can be connected to the SB/ICH 220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

REFERENCE SIGNS

100 Solar Surface Steering System
110 Main Body
115 Rotary Vane Actuator
120 Cavity
120a First Side Cavity
120b Second Side Cavity
121 Hydraulic Port
121a First Side Hydraulic Port
121b Second Side Hydraulic Port
122 Outer Wall
123 Inner Wall
125 Stationary Vane
127 First Rotational Axis
128 Second Rotational Axis
130 Moving Vane
140 Holding Member
141 Support Member
142 First Rotating Joint
143 Second Rotating Joint
150 Base Mount
151 Solar Surface
200 Control System
220 Southbridge/ICH
225 Northbridge/MCH 230 CPU
245 Memory
250 Graphics Processor
256 ROM
258 Graphics Controller
260 Hard Disk Drive
262 PCI
264 USB
266 Optical Drive
270 Keyboard
272 Mouse
276 Serial Port
278 Parallel Port
332 Register
334 ALU
336 Control Logic
338 Instruction Register
340 Fast Memory

The invention claimed is:

1. A solar surface steering system comprising:
a solar surface;
a base mount;
a main body including:
a first rotary vane actuator configured to rotate the solar surface via a first rotating joint; and
a second rotary vane actuator configured to rotate the main body of a hydraulic actuator via a second rotating joint connected to the base mount;
a fluid mover operably connected to each of the first and second rotary vane actuators and configured to actuate the first and second rotary vane actuators; and
a control system electrically connected to the fluid mover and configured to control operations of the fluid mover,
wherein the first and second rotary vane actuators are affixed to each other and positioned such that a rotational axis of the first rotary vane actuator is orthogonal to a rotational axis of the second rotary vane actuator, and
the first rotating joint is connected to the solar surface by a first plurality of supports, wherein the solar surface is rectangular and each corner of the rectangular solar surface is connected to a respective first support of the first plurality of supports and the first supports from opposite sides of the rectangle join at the first rotating joint; and
the second rotating joint is connected to the base mount by a second plurality of supports, wherein the base mount is rectangular and each corner of the rectangular base mount is connected to a respective second support of the second plurality of supports and the second supports from opposite sides of the rectangle join at the second rotating joint.

2. The solar surface steering system of claim 1, wherein the first and second rotary vane actuators each have a substantially semi-cylindrical shape.

3. The solar surface steering system of claim 1, wherein a diameter of each of the first and second rotary vane actuators is approximately equal to an axial length of each of the first and second rotary vane actuators.

4. The solar surface steering system of claim 1, wherein at least one of the first and second rotary vane actuators has a fixed vane which is shorter than a moving vane.

5. The solar surface steering system of claim 1, wherein the first and second rotary vane actuators each have a rotational range of at least 180 degrees.

6. The solar surface steering system of claim 1, wherein at least one of the first and second rotary vane actuators has two fixed vanes equal in length to a moving vane.

7. The solar surface steering system of claim 1, wherein the respective rotational axes of the first and second rotary vane actuators are horizontal.

8. The solar surface steering system of claim 1, wherein a distance between the rotational axes of the first and second rotary vane actuators is less than a diameter of the first and second rotary vane actuators.

9. The solar surface steering system of claim 1, wherein the solar surface is a photovoltaic panel.

10. The solar surface steering system of claim 1, wherein the solar surface is a solar reflector.

11. The solar surface steering system of claim 1, wherein at least one actuator is selected from the group consisting of an electrical actuator, a pneumatic actuator and a piezoelectric actuator.

12. A two dimensional steering hydraulic actuator for a solar surface comprising:
a base mount; and
a main body including:
a first rotary vane actuator configured to rotate the solar surface via a first rotating joint, and
a second rotary vane actuator configured to rotate the main body of the hydraulic actuator via a second rotating joint connected to the base mount, wherein
the first and second rotary vane actuators are affixed to each other and positioned such that a rotational axis of the first rotary vane actuator is orthogonal to a rotational axis of the second rotary vane actuator, and
the first rotating joint is connected to the solar surface by a first plurality of supports, wherein the solar surface is rectangular and each corner of the rectangular solar surface is connected to a respective first support of the first plurality of supports and the first supports from opposite sides of the rectangle join at the first rotating joint; and
the second rotating joint is connected to the base mount by a second plurality of supports, wherein the base mount is rectangular and each corner of the rectangular base mount is connected to a respective second support of the second plurality of supports and the second supports from opposite sides of the rectangle join at the second rotating joint.

13. The two dimensional steering hydraulic actuator of claim 12, wherein the first and second rotary vane actuators each have a substantially semi-cylindrical shape.

14. The two dimensional steering hydraulic actuator of claim 12, wherein a diameter of each of the first and second rotary vane actuators is approximately equal to an axial length of each of the first and second rotary vane actuators.

15. The two dimensional steering hydraulic actuator of claim 12, wherein at least one of the first and second rotary vane actuators has a fixed vane which is shorter than a moving vane.

* * * * *